April 17, 1951          E. M. CLARKE          2,549,170
UTILITY DEVICE FOR COOKING RECEPTACLES
Filed May 20, 1949
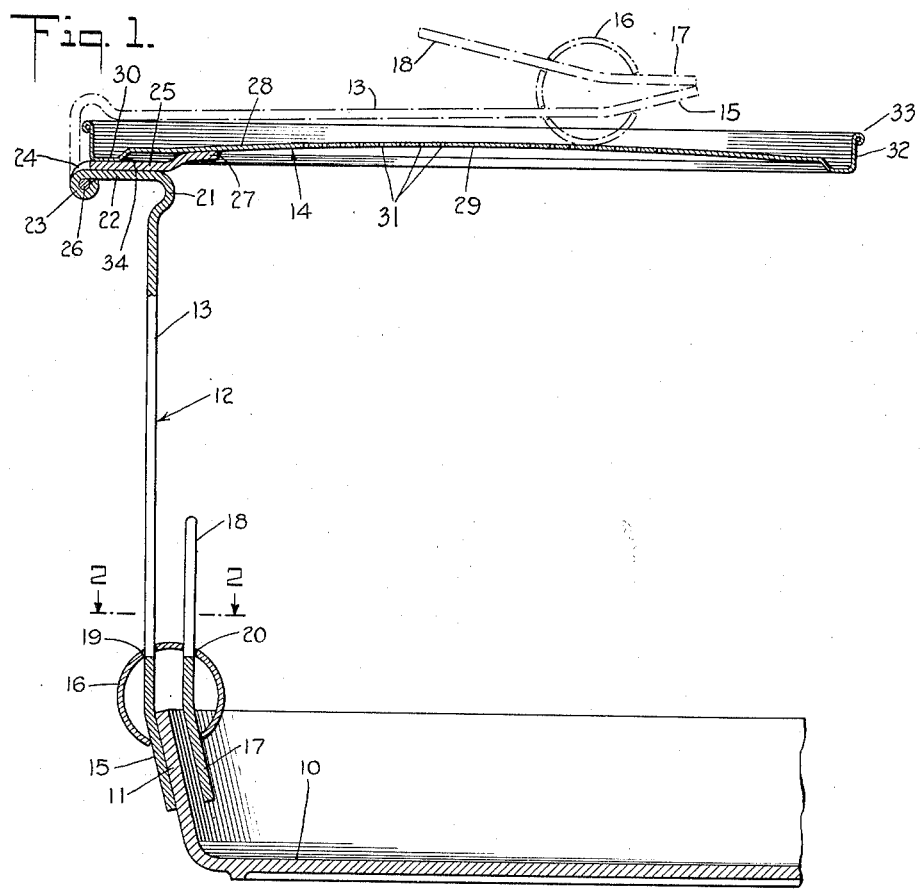
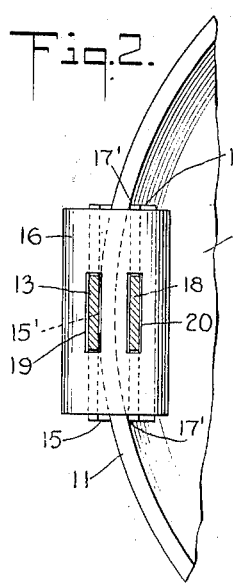
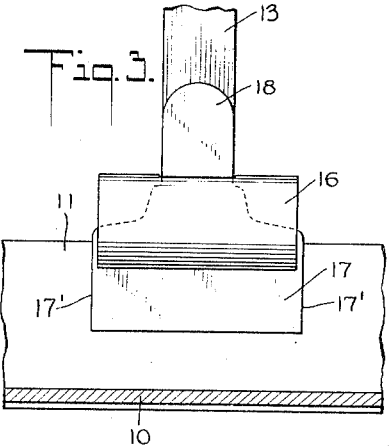
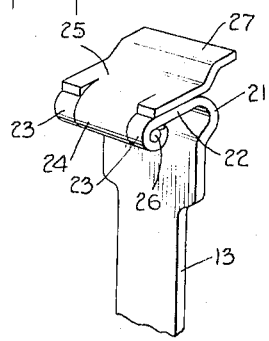
INVENTOR.
EILEEN M. CLARKE
BY
Howard P. Thompson
ATTORNEY Patented Apr. 17, 1951

2,549,170

UNITED STATES PATENT OFFICE 2,549,170

UTILITY DEVICE FOR COOKING RECEPTACLES

Eileen M. Clarke, Brooklyn, N. Y.

Application May 20, 1949, Serial No. 94,293

5 Claims. (Cl. 99—355)

1

This invention relates to devices adapted for quick clamping engagement upon a cooking receptacle to provide, above that receptacle, a table or platform member for the support of products, preferably those removed from the receptacle to maintain such products warm, particularly in preparing a batch of such products and, further, to drain predetermined products. More particularly, the invention deals with a utility device comprising foldably and collapsibly related parts which facilitate compact packaging and storage thereof.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a sectional view through a part of the frying pan showing one of my improved accessory devices mounted thereon, the device being shown in section and in elevation and being indicated in dot and dash lines in collapsed position.

Fig. 2 is a partial section on the line 2—2 of Fig. 1.

Fig. 3 is a face view of the lower portion of the device; and

Fig. 4 is a perspective view of the hinge portion of the separate parts of the device, omitting part of the structure of one part.

In the preparation of various foods, difficulty has been experienced for the storage or maintenance of food in a warm condition after the preparation thereof and before serving the same, as for example, in the preparation of a batch of eggs and bacon, the earlier cooked or prepared bacon and egg or two should be stored and retained warm while other eggs or bacon and eggs are being prepared, particularly when service at one time is desired. This same problem arises in the preparation of a batch of pancakes, griddle cakes or the like and many other food products, such for example as the preparation of French fried potatoes, egg plant, etc., etc.

To satisfy and fulfill this requirement, I provide what may be termed an accessory to a cooking receptacle, such for example, as a frying pan, a supporting table or tray upon which the prepared food products can be stored and drained and, at the same time, kept warm by being disposed directly over the heat arising from the pan and around the pan.

In Fig. 1 of the drawing, I have illustrated one adaptation of my invention, in which 10 represents, in section, a part of a frying pan, having a raised edge portion 11, upon which one of my improved accessory devices 12 is adapted to be clamped. The device 12 comprises two primary parts, namely an upright supporting bar portion 13 and a pan or tray portion 14. The bar 13 has, at its lower end, an angularly extended jaw portion 15 and supported in connection with the lower end of the bar and the jaw portion 15 by a split spring sleeve 16 is a movable jaw portion 17 having a raised fingerpiece end 18. The spring sleeve 16 normally maintains the jaws 15 and 17 in abutting relationship, as seen in dot and dash lines in Fig. 1 and, by moving the fingerpiece end 18 in the direction of the bar 13, the jaw 17 may be opened sufficiently to engage the raised wall 11 of a pan. In this engagement, the wall 11 of the pan is engaged by the central portion 15' of the jaw 15, note Fig. 2, and the outer ends 17' of the jaw 17 thus providing what may be termed a wide spread three-point engagement.

It will appear, from a consideration of Fig. 1, that the bar 13 extends through an aperture 19 in the sleeve 16; whereas, the fingerpiece 18 extends through another aperture 20 in said sleeve, the jaw ends 15 and 17 being of considerably greater width than the shank of the bar 13, as well as the fingerpiece end 18, as will appear in Fig. 3 of the drawing.

The upper end of the bar 13 has a reversely curved portion 21 which terminates in a flat plate part 22 disposed at right angles to the bar 13 and thus is arranged horizontally. The plate portion 22 terminates at its end in spaced pintle bearings 23, note Fig. 4. Arranged between the bearings 23 is another pintle bearing 24 on a plate 25. These bearings are joined by a pintle pin 26. The plate 25 has an inner offset end portion 27, the latter being adapted to be welded or otherwise secured to the lower surface of the plate 28 of the tray or table 14. The plate 28 is slightly tapered from the center portion 29 thereof to an annular peripheral groove 30 in said pan, so as to provide drainage on the surface of the plate 28 into the groove 30. The plate 28 also preferably has a series of perforations 31 arranged circumferentially about the center portion thereof for ventilation and as a further drainage.

The groove 30 is also defined by a raised peripheral wall 32 on the tray, the latter preferably having an inturned beaded edge 33. The particular shape or contour of the tray or pan may be made to suit requirements, but for general practices, a circular tray or pan is probably most desirable for arrangement above and over a frying pan, such as the pan 10.

The plate 15 is also welded or otherwise secured to the downwardly extending groove portion 30 of the tray, as indicated at 34. By providing the hinge coupling between the parts 13, 14, the rod 23, with its clamping end, can be swung upon the upper surface of the tray in the manner indicated in dot and dash lines in Fig. 1 when the device is not in use for a compact storage thereof. Furthermore, this assemblage facilitates the packaging of the accessory. When the parts are in the assembled relationship, shown in full lines in Fig. 1, the tray will be firmly and rigidly supported above the pan 10 to provide a means for storage of prepared food products thereon, while maintaining the pan above the heat arising from the pan and around the pan, thus keeping the products stored on the tray warm until ready to serve. The spacing of the tray above the frying pan will be such as to provide free and accessible use of the pan for the intended purpose.

Having fully described my invention, what I claim as new and desire to secure by Letters Patent is:

1. A food supporting accessory for cooking vessels, said accessory comprising two hingedly coupled parts, one part comprising a tray member and the other part comprising a supporting bar, the major part of which is arranged angularly to the tray member when the accessory is in set up position, means at the lower end of the bar for supporting the same upon a cooking vessel with the tray member disposed above and in spaced relation to the vessel, the upper end of the bar having an angular portion substantially paralleling the tray member, means forming the hinged coupling between said angular portion of the bar and said tray member, and said bar being swingable on said hinged coupling onto the upper surface of the tray member and substantially parallel thereto in collapsing the parts one with respect to the other.

2. A food supporting accessory for cooking vessels, said accessory comprising two hingedly coupled parts, one part comprising a tray member and the other part comprising a supporting bar, the major part of which is arranged angularly to the tray member when the accessory is in set up position, means at the lower end of the bar for supporting the same upon a cooking vessel with the tray member disposed above and in spaced relation to the vessel, the upper end of the bar having an angular portion substantially paralleling the tray member, means forming the hinged coupling between said angular portion of the bar and said tray member, said bar being swingable on said hinged coupling onto the upper surface of the tray member and substantially parallel thereto in collapsing the parts one with respect to the other, and said means comprising a plate on the tray member adapted to rest upon said angular portion of the bar when the parts are arranged in set up condition.

3. A food supporting accessory for cooking vessels, said accessory comprising two hingedly coupled parts, one part comprising a tray member and the other part comprising a supporting bar, the major part of which is arranged angularly to the tray member when the accessory is in set up position, means at the lower end of the bar for supporting the same upon a cooking vessel with the tray member disposed above and in spaced relation to the vessel, the upper end of the bar having an angular portion substantially paralleling the tray member, means forming the hinged coupling between said angular portion of the bar and said tray member, said bar being swingable on said hinged coupling onto the upper surface of the tray member and substantially parallel thereto in collapsing the parts one with respect to the other, said means comprising a plate on the tray member adapted to rest upon said angular portion of the bar when the parts are arranged in set up condition, the tray member having a bevelled drainage surface treminating in a peripheral groove, and the central portion of the tray member having perforations.

4. An accessory device for cooking vessels, comprising a raised bar, means for supporting the bar on the peripheral edge of a vessel, the upper end of the bar having an offset angular portion, a plate hingedly coupled with the angular portion of the bar and normally resting thereon, a tray fixed to said plate and adapted to be disposed horizontally over the vessel on which the device is mounted, said angular portion of the bar being of a length greater than the depth of said tray, whereby in swinging the bar on said hinged coupling, said bar is adapted to be positioned on and substantially parallel with the top of the tray in the collapsed position of the device.

5. An accessory device for cooling vessels, comprising a raised bar, means for supporting the bar on the peripheral edge of a vessel, the upper end of the bar having an offset angular portion, a plate hingedly coupled with the angular portion of the bar and normally resting thereon, a tray fixed to said plate and adapted to be disposed horizontally over the vessel on which the device is mounted, said angular portion of the bar being of a length greater than the depth of said tray, whereby in swinging the bar on said hinged coupling, said bar is adapted to be positioned on and substantially parallel with the top of the tray in the collapsed position of the device, said first named means comprising a clamp portion integral with the lower end of the bar, and a spring actuated jaw movable toward and from said clamp portion.

EILEEN M. CLARKE.

REFERENCES CITED

The following references are of record in the file of this patent:

UNITED STATES PATENTS

| Number | Name | Date |
|---|---|---|
| 1,154,812 | Schulty | Sept. 28, 1915 |
| 1,233,909 | Richardson | July 17, 1917 |
| 2,262,302 | Sinclair | Nov. 11, 1941 |

FOREIGN PATENTS

| Number | Country | Date |
|---|---|---|
| 427,486 | France | Aug. 4, 1911 |
| 589,871 | France | June 6, 1925 |